(12) United States Patent
Peng et al.

(10) Patent No.: US 10,680,456 B2
(45) Date of Patent: Jun. 9, 2020

(54) WEARABLE DEVICE AND WEARABLE DEVICE CHARGING METHOD

(71) Applicant: HUAWEI TECHNOLOGIES CO., LTD., Shenzhen, Guangdong (CN)

(72) Inventors: Rongan Peng, Shenzhen (CN); Muyun Qin, Shenzhen (CN); Shaomin Qi, Shenzhen (CN); Ruimin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 15/753,367

(22) PCT Filed: Aug. 24, 2015

(86) PCT No.: PCT/CN2015/087949
§ 371 (c)(1),
(2) Date: Feb. 19, 2018

(87) PCT Pub. No.: WO2017/031673
PCT Pub. Date: Mar. 2, 2017

(65) Prior Publication Data
US 2018/0248384 A1   Aug. 30, 2018

(51) Int. Cl.
*H02J 7/00* (2006.01)
*H01M 10/44* (2006.01)

(52) U.S. Cl.
CPC .......... *H02J 7/008* (2013.01); *H01M 10/44* (2013.01); *H02J 7/00* (2013.01); *H02J 7/0003* (2013.01); *H02J 2207/40* (2020.01)

(58) Field of Classification Search
CPC ......... Y02E 60/12; H02J 7/0068; H02J 7/022; H02J 7/0031; H01M 10/44
See application file for complete search history.

(56) References Cited

U.S. PATENT DOCUMENTS

| 6,384,570 B2 | 5/2002 | Matsuyama | |
| 2007/0132427 A1* | 6/2007 | Veselic | H02J 7/0068 320/111 |
| 2007/0182363 A1* | 8/2007 | Yang | H01M 2/1055 320/107 |

(Continued)

FOREIGN PATENT DOCUMENTS

| CN | 202852660 U | 4/2013 |
| CN | 203135515 U | 8/2013 |

(Continued)

OTHER PUBLICATIONS

Chuntao Zhang et al.,"A Combined Charger Topology for Wind Energy System Application",Science and Technology Information,vol. 33,dated 2007, 6 pages.

(Continued)

*Primary Examiner* — Arun C Williams
(74) *Attorney, Agent, or Firm* — Fish & Richardson P.C.

(57) ABSTRACT

The present disclosure relates to a wearable device and a wearable device charging method. The device includes a connector, a charging module, and a battery. The connector includes a first input end, a second input end, a first output end, and a second output end. The first input end is configured to receive a current signal, and the second input end is configured to receive a voltage signal. The first output end is connected to the charging module, and the charging module and the second output end are connected to the battery. The connector determines, according to the voltage signal of the second input end, whether the current signal is to be transmitted by the first output end or to be transmitted by the second output end to cause the wearable device to charge the battery according to the current signal directly or by the charging module.

13 Claims, 3 Drawing Sheets

(56) References Cited

U.S. PATENT DOCUMENTS

| | | | | |
|---|---|---|---|---|
| 2008/0272741 | A1* | 11/2008 | Kanamori | H02J 7/00 320/137 |
| 2010/0194352 | A1* | 8/2010 | Kitano | H02J 7/0031 320/162 |
| 2010/0235575 | A1* | 9/2010 | Yasaki | G06F 21/554 711/115 |
| 2012/0215468 | A1* | 8/2012 | Geris | G06F 1/28 702/61 |
| 2013/0183562 | A1* | 7/2013 | Workman | H01M 2/1022 429/100 |
| 2013/0329532 | A1* | 12/2013 | Sorias | G04C 10/00 368/64 |
| 2014/0152234 | A1 | 6/2014 | Herrmann et al. | |
| 2014/0232342 | A1* | 8/2014 | Turner | H02J 7/0042 320/114 |
| 2015/0332563 | A1* | 11/2015 | Davis | G08B 5/006 342/66 |

FOREIGN PATENT DOCUMENTS

| | | |
|---|---|---|
| CN | 203181243 U | 9/2013 |
| CN | 104510467 A | 4/2015 |
| CN | 104578301 A | 4/2015 |
| CN | 104823349 A | 8/2015 |
| JP | 2002315231 A | 10/2002 |
| JP | 2008167562 A | 7/2008 |

OTHER PUBLICATIONS

International Search Report issued in International Application No. PCT/CN2015/087949 dated May 23, 2016, 15 pages.

* cited by examiner

WEARABLE DEVICE AND WEARABLE
DEVICE CHARGING METHOD

CROSS-REFERENCE TO RELATED
APPLICATIONS

This application is a national stage of International Application No. PCT/CN2015/087949, filed on Aug. 24, 2015, which is hereby incorporated by reference in its entirety.

TECHNICAL FIELD

The present invention relates to the field of communications technologies, and in particular, to a wearable device and a wearable device charging method.

BACKGROUND

With development of communications technologies, various wearable devices gradually emerge. Main product forms include a wristband and a wristwatch that are mainly applied to step counting and sleep monitoring. Because a wearable device needs to be worn on a human body, a product needs to have a small size and a light weight to achieve good user experience. However, it is difficult to obtain a large battery capacity, and a user needs to frequently charge a wearable device, thereby causing relatively poor user experience.

Currently, a mainstream wearable device mainly includes three core components: an acceleration sensor (Gravity-sensor, G-Sensor), responsible for action monitoring; a microcontroller unit (Microcontroller Unit, MCU), used as master control of a system; and Bluetooth (Bluetooth, BT), used as a manner of connecting a wristband and another device. Normal usage time of such a wristband system is about one week. For example, because a smart band with the foregoing system has a display and supports more functions, usage time of the smart band is merely two to three days, and the smart band needs to be frequently charged, thereby causing relatively poor product user experience.

SUMMARY

Embodiments of the present invention provide a wearable device and a wearable device charging method, so that the wearable device has multiple charging manners, and can flexibly select different chargers for charging, to adapt to different scenarios in which the wearable device is to be charged, and improve user experience.

According to a first aspect, the present invention provides a wearable device, where the wearable device includes a connector, a charging module, and a battery, where the connector includes a first input end, a second input end, a first output end, and a second output end; the first input end is configured to receive a current signal, and the second input end is configured to receive a voltage signal; the first output end is connected to the charging module, and the charging module and the second output end are connected to the battery; and the current signal and the voltage signal are provided by an external charging device; and the connector determines, according to a level of the second input end, whether the current signal is to be transmitted by using the first output end or to be transmitted by using the second output end, so that the wearable device charges the battery according to the current signal and by using the charging module, or directly charges the battery.

With reference to the first aspect, in a first possible implementation manner, the connector includes: when the charging device provides a low-level voltage signal, the level of the second input end is pulled down; and the connector determines that the current signal is to be transmitted by using the first output end, so that the battery is charged by using the charging module.

With reference to the first aspect, in a second possible implementation manner, when the charging device provides no voltage signal, and the current signal received by the first input end is not 0, the level of the second input end is pulled down; and the connector determines that the current signal is to be transmitted by using the first output end, so that the battery is charged by using the charging module.

With reference to the first aspect, in a third possible implementation manner, when the charging device provides no voltage signal, and the current signal received by the first input end is 0, the battery is not to be charged.

With reference to the first aspect, in a fourth possible implementation manner, when the charging device provides a high-level voltage signal, the level of the second input end is pulled up; and the connector determines that the current signal is to be transmitted by using the second output end, so that the battery is directly charged.

With reference to the first aspect or the first, the second, the third, or the fourth possible implementation manner of the first aspect, in the fourth possible implementation manner, the connector further includes:

a first switch module, where the first switch module is connected to the first input end and the first output end;

a second switch module, where the second switch module is connected to the first input end and the second output end;

a first circuit, connected to the second input end and configured to pull down the level of the second input end; and a NOT gate circuit, configured to control closing or opening of the first switch module, where an input end of the NOT gate circuit is connected to the second input end; where an enable end of the first switch module is connected to an output end of the NOT gate circuit, and an enable end of the second switch module is connected to the second input end.

According to a second aspect, an embodiment of the present invention provides a wearable device charging method, where the charging method includes:

receiving, by a first input end of a connector, a current signal; and determining, by the connector according to a level of a second input end of the connector, whether the current signal received by the first input end is to be transmitted to a charging module by using a first output end of the connector or to be transmitted to a battery by using a second output end of the connector, so that the wearable device charges the battery according to the current signal and by using the charging module, or directly charges the battery, where the current signal and the voltage signal are provided by an external charging device.

With reference to the second aspect, in a first possible implementation manner, when the charging device provides a low-level voltage signal, the level of the second input end is pulled down; and the determining, by the connector according to the voltage signal received by a second input end of the connector, whether the current signal received by the first input end is to be transmitted to a charging module by using a first output end of the connector or to be transmitted to a battery by using a second output end of the connector includes:

determining, by the connector according to the voltage signal received by the second input end, that the current signal received by the first input end is to be transmitted to the charging module by using the first output end, so that the wearable device charges the battery according to the current signal and by using the charging module.

With reference to the second aspect, in a second possible implementation manner, when the charging device provides no voltage signal, and the current signal received by the first input end is not 0, the level of the second input end is pulled down; and the determining, by the connector according to a level of a second input end of the connector, whether the current signal received by the first input end is to be transmitted to a charging module by using a first output end of the connector or to be transmitted to a battery by using a second output end of the connector includes:

determining, by the connector according to the level of the second input end, that the current signal received by the first input end is to be transmitted to the charging module by using the first output end, so that the wearable device charges the battery according to the current signal and by using the charging module.

With reference to the second aspect, in a third possible implementation manner, when the charging device provides no voltage signal, and the current signal received by the first input end is 0, the battery is not to be charged.

With reference to the second aspect, in a fourth possible implementation manner, when the charging device provides a high-level voltage signal, the charging device provides the high-level voltage signal, and the level of the second input end is pulled up; and the determining, by the connector according to a level of a second input end of the connector, whether the current signal received by the first input end is to be transmitted to a charging module by using a first output end of the connector or to be transmitted to a battery by using a second output end of the connector includes:

determining, by the connector according to the level of the second input end, that the current signal received by the first input end is to be transmitted to the battery by using the second output end, so that the wearable device directly charges the battery by using the current signal.

According to the wearable device and the wearable device charging method provided in the embodiments of the present invention, a connector determines, according to a level of a second input end, whether a current signal received by a first input end is to be transmitted, by using a first output end, to a charging module to charge a battery, or to be directly transmitted to a battery by using a second output end. In this way, the wearable device can support multiple charging manners, and user experience is improved.

DESCRIPTION OF EMBODIMENTS

The technical solutions of the present invention are further described in detail with reference to accompanying drawings and embodiments as follows:

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

To facilitate understanding of the embodiments of the present invention, the following provides further explanations with reference to the accompanying drawings by using specific embodiments. The embodiments constitute no limitation on the embodiments of the present invention.

The following describes in detail a wearable device and a wearable device charging method provided in the embodiments of the present invention.

Figure 1:
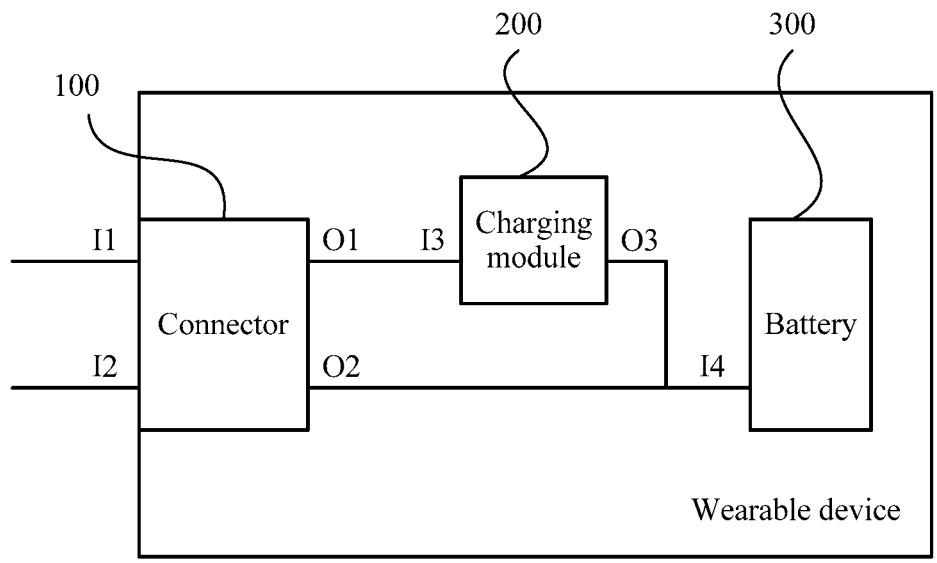
FIG. 1 is a schematic structural diagram of a wearable device according to Embodiment 1 of the present invention.

FIG. 1 is a schematic structural diagram of a wearable device according to Embodiment 1 of the present invention. As shown in FIG. 1, the wearable device includes a connector 100, a charging module 200, and a battery 300.

The connector 100 includes a first input end I2, a second input end I2, a first output end O1, and a second output end O2. The first input end I1 is configured to receive a current signal, and the second input end I2 is configured to receive a voltage signal. The first output end O1 is connected to the charging module 200, and the second output end O2 is connected to the battery 300. The current signal and the voltage signal are provided by an external charging device.

The charging module 200 includes a charging module input end I3 and a charging module output end O3. The charging module input end I3 is connected to the first input end O1, and the charging module output end O3 is connected to the battery 300.

The battery 300 includes a battery input end I4. The battery input end I4 has two leads. One is connected to the charging module 200, and the other is connected to the second output end O2.

The connector 100 determines, according to a level of the second input end I2, whether the current signal is to be transmitted by using the first output end O1 or to be transmitted by using the second output end O2, so that the wearable device charges the battery 300 according to the current signal and by using the charging module 200, or directly charges the battery 300.

It should be further noted that, in this embodiment of the present invention, the charging device may be specifically an electric energy charging device, a solar energy charging device, a thermal energy charging device, or an energy charging device in another form. For example, in the electric energy charging device, when the charging device performs charging by using a USB-form device, the battery 300 cannot be directly charged because an input current signal is a high current. Therefore, the input current signal needs to be processed by using the charging module 200, to convert the input current signal into a charging signal of the battery 300. When the charging device is the solar energy charging device, the thermal energy charging device, or the energy charging device in another form, a voltage divider circuit may be disposed inside the charging device, so that an input current signal becomes a low-current signal, and the battery 300 can be directly charged.

Specifically, when the charging device provides a low-level voltage signal, for example, the charging device is a USB-form device with OTG, the level of the second input end I2 is pulled down. In this case, the connector 100 determines that the current signal is to be transmitted by using the first output end O1, so that the battery 300 is charged by using the charging module 200.

When the charging device provides no voltage signal, and the current signal received by the first input end I1 is not 0, for example, the charging device is a USB-form device without OTG, the level of the second input end I2 is pulled down inside the connector 100. For example, a resistor or another circuit may be connected to the second input end I2 to perform voltage division on the second input end I2, so as to pull down the level of the second input end I2. In this case, the connector 100 determines that the current signal is to be transmitted by using the first output end O1, so that the battery 300 is charged by using the charging module 200.

When the charging device provides no voltage signal, and the current signal received by the first input end I1 is 0, for example, the connector 100 and the charging device are disconnected, or connected but in a power-off case, the level of the second input end I2 is pulled down inside the connector 100, and the first input end I1 establishes a connection to the first output end O1. Because an input of the first input end I1 is 0, the battery 300 is not to be charged.

When the charging device provides a high-level voltage signal, for example, the charging device is a non-USB-form device, the level of the second input end I2 is pulled up inside the charging device. In this case, the connector 100 determines that the current signal is to be transmitted by using the second output end O2, so that the battery 300 is directly charged.

The wearable device provided in this embodiment of the present invention supports multiple charging manners, and may be charged in an electric energy charging manner or in another charging manner such as a solar energy charging manner. Therefore, usage time of the wearable device is extended, and user experience is improved.

Optionally, based on the foregoing embodiment, the connector in the wearable device further includes a first switch module, a second switch module, a first circuit, and a NOT gate circuit.

Figure 2:
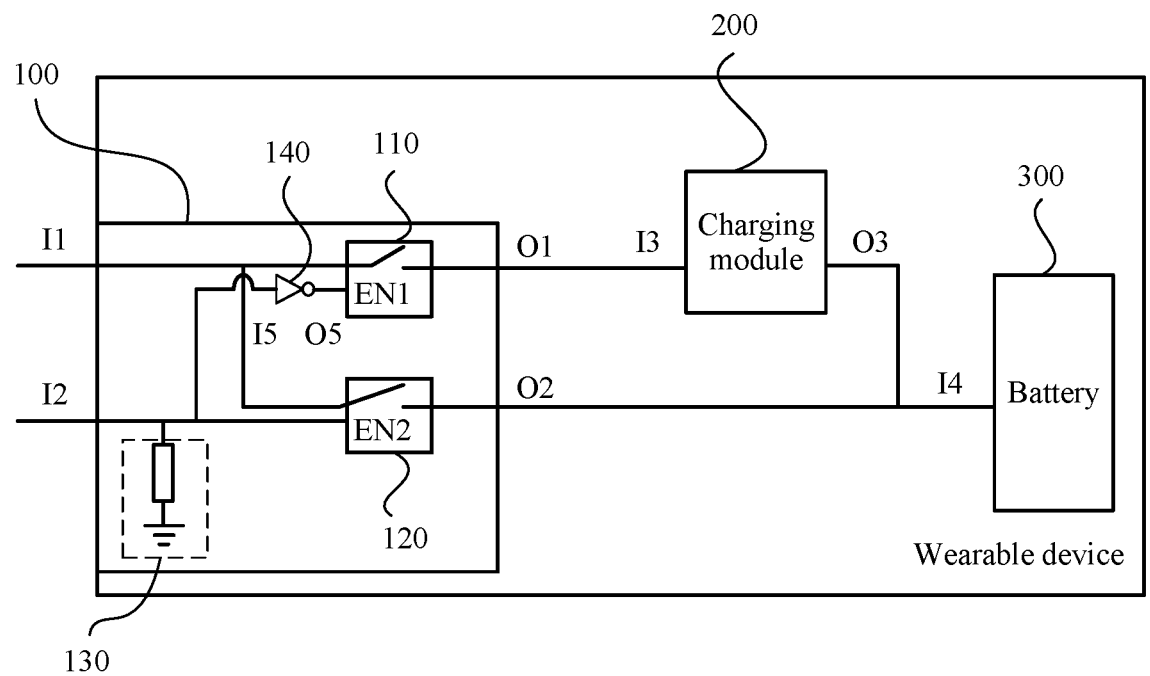
FIG. 2 is a schematic structural diagram of a wearable device according to Embodiment 2 of the present invention.

FIG. 2 is a schematic structural diagram of a wearable device according to Embodiment 2 of the present invention. As shown in the figure, a connector in the wearable device further includes a first switch module 110, a second switch module 120, a first circuit 130, and a NOT gate circuit 140.

The first switch module 110 is connected to a first input end I1 and a first output end O1 inside the connector. The second switch module 120 is connected to the first input end I1 and a second output end O2 inside the connector. The first circuit 130 is connected to a second input end I2, and configured to pull down a level of the second input end I2. The NOT gate circuit 140 is configured to control closing or opening of the first switch module 110, and an input end I5 of the NOT gate circuit 140 is connected to the second input end I2. An enable end EN1 of the first switch module 110 is connected to an output end O5 of the NOT gate circuit 140. An enable end EN2 of the second switch module 120 is connected to the second input end I2.

Figure 3:
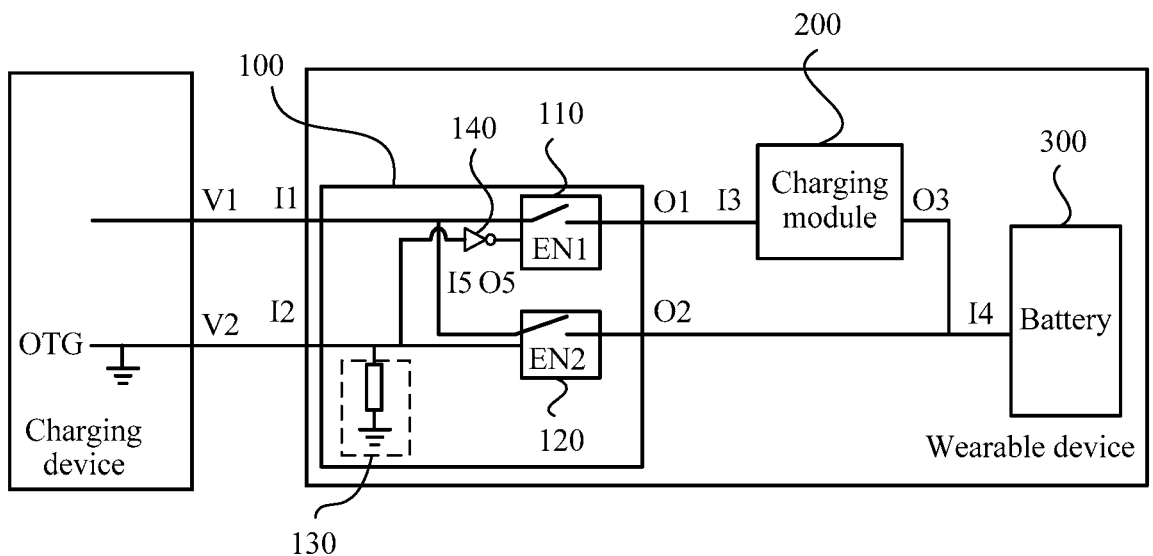
FIG. 3 is a first schematic charging diagram of the wearable device according to Embodiment 2 of the present invention.

FIG. 3 is a first schematic charging diagram of the wearable device according to Embodiment 2 of the present invention. As shown in the figure, a charging device is a USB-form device with OTG. The charging device includes a first charging device output end V1 and a second charging device output end V2. The first charging device output end V1 is connected to the first input end I1, and the second charging device output end V2 is connected to the second input end I2.

In a specific charging process, the second charging device output end V2 is an OTG end. As shown in the figure, in the charging device, the OTG end is designed to be grounded to pull down the OTG end inside the charging device, and the second charging device output end V2 outputs a low-level voltage signal, so that a level of the second input end I2 is pulled down. The enable end EN2 of the second switch module 120 receives the low-level voltage signal, and the second switch module 120 is in an open state. The low-level voltage signal input by the second input end I2 is converted into a high-level voltage signal by using the NOT gate circuit 140, and the enable end EN1 of the first switch module 110 receives the high-level voltage signal, so as to close the first switch module 110.

In the connector 100, the first input end I1 establishes a connection to the first output end O1 by using the first switch module 110. The first input end I1 receives a current signal from the first charging device output end V1, the current signal is transmitted to a charging module 200 by using the first output end O1, and the charging module 200 converts the received current signal into a charging signal and further charges a battery 300 by using the charging signal.

Figure 4:
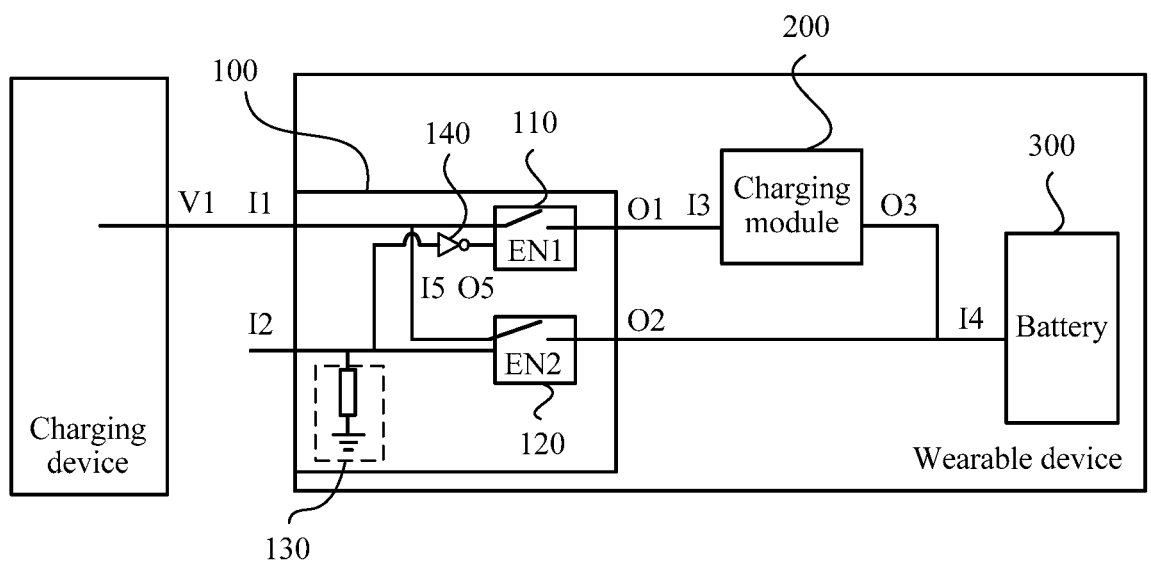
FIG. 4 is a second schematic charging diagram of the wearable device according to Embodiment 2 of the present invention.

FIG. 4 is a second schematic charging diagram of the wearable device according to Embodiment 2 of the present invention. As shown in the figure, a charging device is a USB-form device without OTG. The charging device includes a first charging device output end V1, and the first charging device output end V1 is connected to the first input end I1.

In a specific charging process, the charging device provides no voltage signal. As shown in the figure, in the connector 100, the first circuit 130 performs voltage division on the second input end I2 to pull down a level of the second input end I2. The enable end EN2 of the second switch module 120 receives a low-level voltage signal, and the second switch module 120 is in an open state. The low-level voltage signal input by the second input end I2 is converted into a high-level voltage signal by using the NOT gate circuit 140, and the enable end EN1 of the first switch module 110 receives the high-level voltage signal, so as to close the first switch module 110. The connector 100 determines that a current signal is to be transmitted by using the first output end O1, so that a battery 300 is charged by using a charging module 200. The specific process is the same as the charging process of the USB-form charging device with OTG. Details are not described herein.

Figure 5:
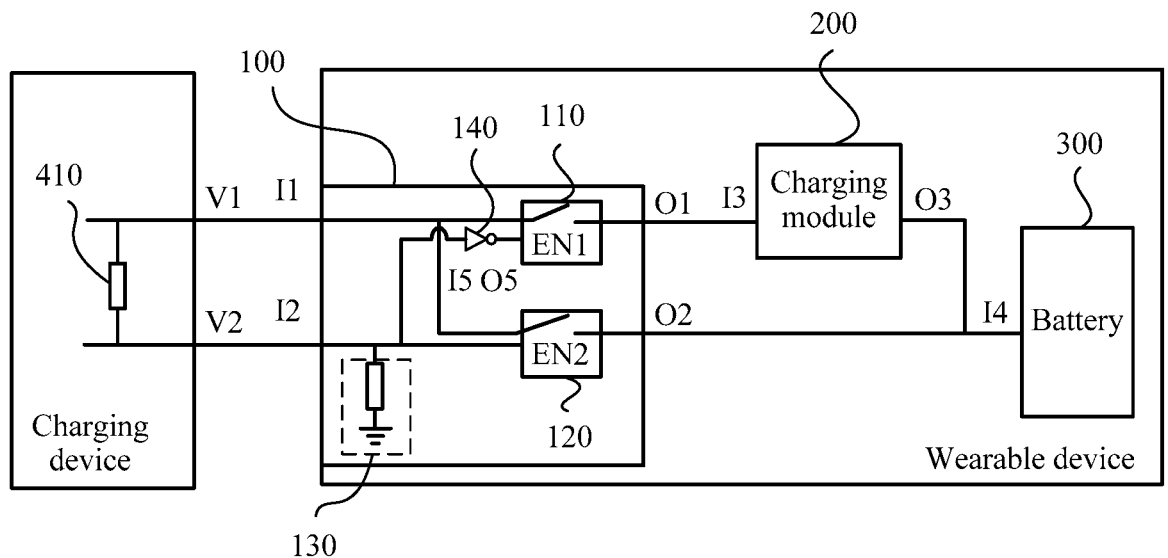
FIG. 5 is a third schematic charging diagram of the wearable device according to Embodiment 2 of the present invention.

FIG. 5 is a third schematic charging diagram of the wearable device according to Embodiment 2 of the present invention. As shown in the figure, a charging device is a non-USB-form device. The charging device includes a first charging device output end V1 and a second charging device output end V2. A voltage divider resistor 410 is disposed between the first charging device output end V1 and the second charging device output end V2. The first charging device output end V1 is connected to the first input end I1, and the second charging device output end V2 is connected to the second input end I2.

In a specific charging process, the second charging device output end V2 is pulled up by the resistor 410 inside the charging device, the second charging device output end V2 outputs a high-level voltage signal, and the second input end I2 receives the high-level voltage signal. Because the high-level voltage signal received by the second input end I2 is pulled up inside the charging device, the voltage signal is still a high-level voltage signal after being pulled down by using the first circuit 130. The enable end EN2 of the second switch module 120 receives the high-level voltage signal, so as to close the second switch module 120. The high-level voltage signal is converted into a low-level voltage signal by using the NOT gate circuit 140, the enable end EN1 of the first switch module 110 receives the low-level voltage signal, and the first switch module 110 is in an open state.

In the connector 100, the first input end I1 establishes a connection to the second output end O2 by using the second switch module 120. Due to voltage division performed by the resistor 410 inside the charging device, the first charging device output end V1 outputs a relatively-low-current signal, so that a battery 300 can be directly charged. The first input end I1 receives a current signal from the first charging device output end V1, and the current signal is transmitted by using the second output end O2, so that the battery 300 is directly charged.

Preferably, when the connector 100 and the charging device are disconnected, or the connector 100 and the charging device are connected but the current signal output by the charging device is 0, the battery 300 is not to be charged.

Specifically, when the charging device provides no voltage signal, a level of the second input end I2 is pulled down by the first circuit 130. The enable end EN2 of the second switch module 120 receives a low-level voltage signal, and the second switch module 120 is in an open state. The low-level voltage signal input by the second input end I2 is converted into a high-level voltage signal by using the NOT gate circuit 140, and the enable end EN1 of the first switch module 110 receives the high-level voltage signal, so as to close the first switch module 110. The first input end I1 establishes a connection to the first output end O1 by using the first switch module 110. Because an input of the first input end I1 is 0, the battery 300 is not to be charged. Therefore, even if the switch module inside the connector is closed, the battery is not charged, and user experience is improved.

The wearable device provided in this embodiment of the present invention supports multiple charging manners. A first input end I1 is selectively connected to a first output end O1 or connected to a second output end O2 by using a first switch module 110 and a second switch module 120 in a connector 100, so that the wearable device supports multiple charging manners, and user experience is improved.

To make the objectives, technical solutions, and advantages of the present invention clearer, the following further describes the specific embodiment of the present invention in detail with reference to the accompanying drawing.

Figure 6:
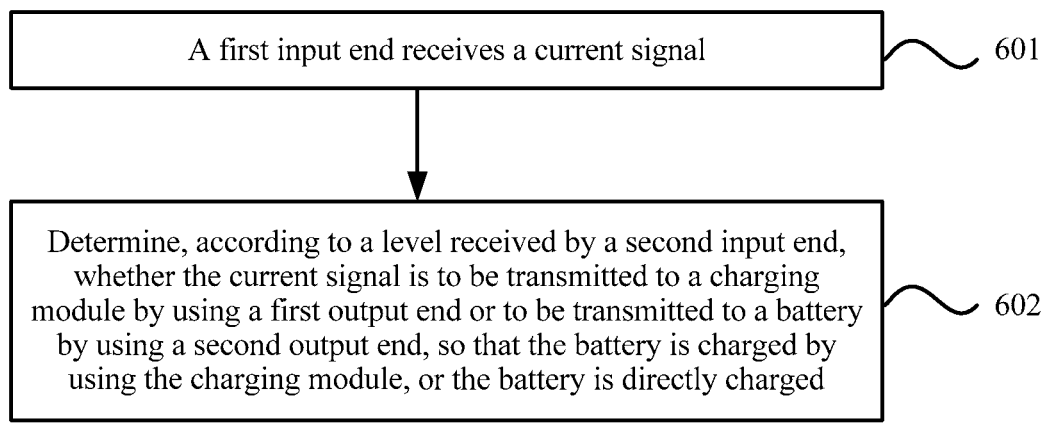
FIG. 6 is a flowchart of a wearable device charging method according to Embodiment 3 of the present invention.

FIG. 6 is a flowchart of a wearable device charging method according to Embodiment 3 of the present invention. The charging method provided in this embodiment of the present invention is based on the wearable device described in the foregoing embodiments. As shown in the figure, the wearable device charging method in this embodiment of the present invention specifically includes the following steps.

Step 601: A first input end receives a current signal.

Specifically, the first input end of a connector receives a current signal from a charging device. The charging device includes an electric energy charging device, a solar energy charging device, a thermal energy charging device, or an energy charging device in another form.

Step 602: Determine, according to a level received by a second input end, whether the current signal is to be transmitted to a charging module by using a first output end or to be transmitted to a battery by using a second output end, so that the battery is charged by using the charging module, or the battery is directly charged.

Specifically, it is determined, according to the level of the second input end of the connector, whether the current signal received by the first input end is to be transmitted to the charging module by using the first output end of the connector or to be transmitted to the battery by using the second output end of the connector, so that the battery is charged by using the charging module, or the battery is directly charged.

When charging devices are different, wearable device charging methods are different.

When the charging device provides a low-level voltage signal and the current signal, for example, the charging device is a USB-form device with OTG, the level of the second input end is pulled down inside the charging device. The first input end receives the current signal. The connector determines, according to the level of the second input end, that the current signal received by the first input end is to be transmitted to the charging module by using the first output end, so that the wearable device charges the battery according to the current signal and by using the charging module.

When the charging device provides no voltage signal, and the provided current signal is not 0, for example, the charging device is a USB-form device without OTG, the level of the second input end is pulled down inside the connector. The first input end receives the current signal. The connector determines, according to the level of the second input end, that the current signal received by the first input end is to be transmitted to the charging module by using the first output end, so that the wearable device charges the battery according to the current signal and by using the charging module.

When the charging device provides no voltage signal, and the provided current signal is 0, for example, the connector and the charging device are disconnected, or connected but in a power-off case, the level of the second input end is pulled down inside the connector, and the first input end establishes a connection to the first output end. Because an input current of the first input end is 0, the battery is not to be charged.

When the charging device provides a high-level voltage signal, for example, the charging device is a non-USB-form device, the level of the second input end is pulled up inside the charging device. The first input end receives the current signal. The connector determines, according to the level of the second input end, that the current signal received by the first input end is to be transmitted to the battery by using the second output end, so that the wearable device directly charges the battery by using the current signal.

According to the wearable device charging method provided in this embodiment of the present invention, a wearable device may be charged in an electric energy charging manner or in another charging manner such as a solar energy charging manner, and multiple charging manners do not affect each other. Therefore, usage time of the wearable device is extended, and user experience is improved.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A wearable device, wherein the wearable device comprises a connector, a charging module, and a battery, wherein
the connector comprises a first input end, a second input end, a first output end, and a second output end; wherein the first input end is configured to receive a current signal, and the second input end is configured to receive a voltage signal; the first output end is connected to the charging module, and the charging module and the second output end are connected to the battery; and the current signal and the voltage signal are provided by an external charging device; and
the connector determines, according to the voltage signal of the second input end, whether the current signal is to be transmitted by the first output end or to be transmitted by the second output end to cause the wearable device to charge the battery according to the current signal directly or by the charging module.

2. The wearable device according to claim 1, wherein in response to the external charging device providing a low-level voltage signal, the voltage signal of the second input end is pulled down; and the connector determines that the current signal is to be transmitted by the first output end to cause the battery to be charged by the charging module.

3. The wearable device according to claim 1, wherein in response to the external charging device providing no voltage signal, and the current signal received by the first input end being not 0, the voltage signal of the second input end is pulled down; and the connector determines that the current signal is to be transmitted by the first output end to cause the battery to be charged by the charging module.

4. The wearable device according to claim 1, wherein in response to the external charging device providing no voltage signal, and the current signal received by the first input end being 0, the battery is not to be charged.

5. The wearable device according to claim 1, wherein in response to the external charging device providing a high-level voltage signal, the voltage signal of the second input end is pulled up; and the connector determines that the current signal is to be transmitted by the second output end, wherein the battery is directly charged.

6. The wearable device according to claim 1, wherein the connector further comprises:
a first switch, wherein the first switch is connected to the first input end and the first output end;
a second switch, wherein the second switch is connected to the first input end and the second output end;
a first circuit, connected to the second input end and configured to pull down the voltage signal of the second input end; and
a NOT gate circuit configured to control closing or opening of the first switch, wherein an input end of the NOT gate circuit is connected to the second input end; wherein
an enable end of the first switch is connected to an output end of the NOT gate circuit, and an enable end of the second switch is connected to the second input end.

7. A wearable device charging method, wherein the wearable device comprises a connector, a charging module, and a battery, the charging method comprising:
receiving, by a first input end of the connector, a current signal;
determining, by the connector according to a voltage signal of a second input end of the connector, whether the current signal received by the first input end is to be transmitted to the charging module by a first output end of the connector or to be transmitted to the battery by a second output end of the connector, wherein the current signal and the voltage signal are provided by an external charging device; and
causing the wearable device to charge the battery according to the current signal directly or by the charging module.

8. The charging method according to claim 7, wherein in response to the charging device providing a low-level voltage signal, the voltage signal of the second input end is pulled down; and
the determining, by the connector according to a voltage signal of a second input end of the connector, whether the current signal received by the first input end is to be transmitted to a charging module by a first output end of the connector or to be transmitted to the battery by a second output end of the connector comprises:
determining, by the connector according to the voltage signal of the second input end, that the current signal received by the first input end is to be transmitted to the charging module by the first output end to cause the wearable device to charge the battery according to the current signal by the charging module.

9. The charging method according to claim 7, wherein when the charging device provides no voltage signal, and the current signal received by the first input end is not 0, the voltage signal of the second input end is pulled down; and
the determining, by the connector according to a voltage signal of a second input end of the connector, whether the current signal received by the first input end is to be transmitted to a charging module by a first output end of the connector or to be transmitted to the battery by a second output end of the connector comprises:
determining, by the connector according to the voltage signal of the second input end, that the current signal received by the first input end is to be transmitted to the charging module by the first output end that to cause the wearable device to charge the battery according to the current signal by the charging module.

10. The charging method according to claim 7, wherein in response to the charging device providing no voltage signal, and the current signal received by the first input end is 0, the battery is not to be charged.

11. The charging method according to claim 7, wherein in response to the charging device providing a high-level voltage signal, the voltage signal of the second input end is pulled up; and the determining, by the connector according to a voltage signal of a second input end of the connector, whether the current signal received by the first input end is to be transmitted to a charging module by a first output end of the connector or to be transmitted to battery by a second output end of the connector comprises:

determining, by the connector according to the voltage signal of the second input end, that the current signal received by the first input end is to be transmitted to the battery by the second output end to cause the wearable device to charge the battery directly according to the current signal.

12. The wearable device according to claim 2, wherein the connector further comprises:

a first switch, wherein the first switch is connected to the first input end and the first output end;

a second switch, wherein the second switch is connected to the first input end and the second output end;

a first circuit, connected to the second input end and configured to pull down the voltage signal of the second input end; and a NOT gate circuit configured to control closing or opening of the first switch, wherein an input end of the NOT gate circuit is connected to the second input end; wherein an enable end of the first switch is connected to an output end of the NOT gate circuit, and an enable end of the second switch is connected to the second input end.

13. The wearable device according to claim 5, wherein the connector further comprises:

a first switch, wherein the first switch is connected to the first input end and the first output end;

a second switch, wherein the second switch is connected to the first input end and the second output end;

a first circuit, connected to the second input end and configured to pull down the voltage signal of the second input end; and a NOT gate circuit configured to control closing or opening of the first switch, wherein an input end of the NOT gate circuit is connected to the second input end; wherein an enable end of the first switch is connected to an output end of the NOT gate circuit, and an enable end of the second switch is connected to the second input end.

\* \* \* \* \*

UNITED STATES PATENT AND TRADEMARK OFFICE
CERTIFICATE OF CORRECTION

PATENT NO.      : 10,680,456 B2
APPLICATION NO. : 15/753367
DATED           : June 9, 2020
INVENTOR(S)     : Rongan Peng et al.

Page 1 of 1

It is certified that error appears in the above-identified patent and that said Letters Patent is hereby corrected as shown below:

In the Claims

In Column 10, Line 67, in Claim 9, after "end" delete "that".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*